(12) United States Patent
Chien et al.

(10) Patent No.: US 9,804,698 B2
(45) Date of Patent: Oct. 31, 2017

(54) TOUCH DEVICE

(71) Applicant: InnoLux Corporation, Miao-Li County (TW)

(72) Inventors: Chuan-Chi Chien, Miao-Li County (TW); Chia-Hsiung Chang, Miao-Li County (TW); Yang-Chen Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 226 days.

(21) Appl. No.: 14/687,138

(22) Filed: Apr. 15, 2015

(65) Prior Publication Data

US 2016/0202780 A1    Jul. 14, 2016

(30) Foreign Application Priority Data

Jan. 8, 2015  (TW) .............................. 104100492 A

(51) Int. Cl.
*G06F 3/041* (2006.01)
*G06F 3/044* (2006.01)

(52) U.S. Cl.
CPC ............. *G06F 3/041* (2013.01); *G06F 3/044* (2013.01); *G06F 2203/04102* (2013.01); *G06F 2203/04103* (2013.01); *G06F 2203/04111* (2013.01)

(58) Field of Classification Search
CPC ................... G06F 3/044; G06F 3/0412; G06F 2203/04103; G06F 2203/04111; G06F 3/041; G06F 2203/04112; G06F 2203/04107; G06F 3/047; G06F 3/03547; G06F 3/0416; G06F 3/0418;

(Continued)

(56) References Cited

U.S. PATENT DOCUMENTS 7,768,126 B2 *  8/2010  Fischer ............. H01L 21/76843
                                                257/751
2012/0113042 A1   5/2012  Bayramoglu et al.
(Continued)

FOREIGN PATENT DOCUMENTS

| TW | 201220167 | 5/2012 |
|----|-----------|--------|
| TW | 201349050 | 12/2013 |
| TW | 1463544 | 12/2014 |

OTHER PUBLICATIONS

Chinese language office action dated Mar. 21, 2016, issued in application No. TW 104100492.

*Primary Examiner* — Duc Dinh
(74) *Attorney, Agent, or Firm* — McClure, Qualey & Rodack, LLP

(57) ABSTRACT

A touch device including a substrate and a sensing electrode thereon is provided. An insulation layer is disposed on the sensing electrode, wherein the insulation layer includes a first contact via exposing a part of a terminal of the sensing electrode. A trace is disposed on the insulation layer and electrically connected to the terminal of the sensing electrode through the first contact via. A corner in the first contact via includes a first edge, a second edge, and a third edge, wherein the second edge is disposed between the first edge and the third edge. The first edge and the second edge include a first angle therebetween of greater than 90 degrees, and the second edge and the third edge include a second angle therebetween of greater than 90 degrees.

20 Claims, 16 Drawing Sheets

(58) Field of Classification Search
CPC .... G06F 3/0421; G06F 3/045; G06F 17/5068; G06F 17/5081
See application file for complete search history.

(56) References Cited

U.S. PATENT DOCUMENTS

2013/0038553 A1* 2/2013 Huang ................ G06F 3/044
345/173
2013/0194224 A1* 8/2013 Lai ..................... G06F 3/0412
345/174

* cited by examiner

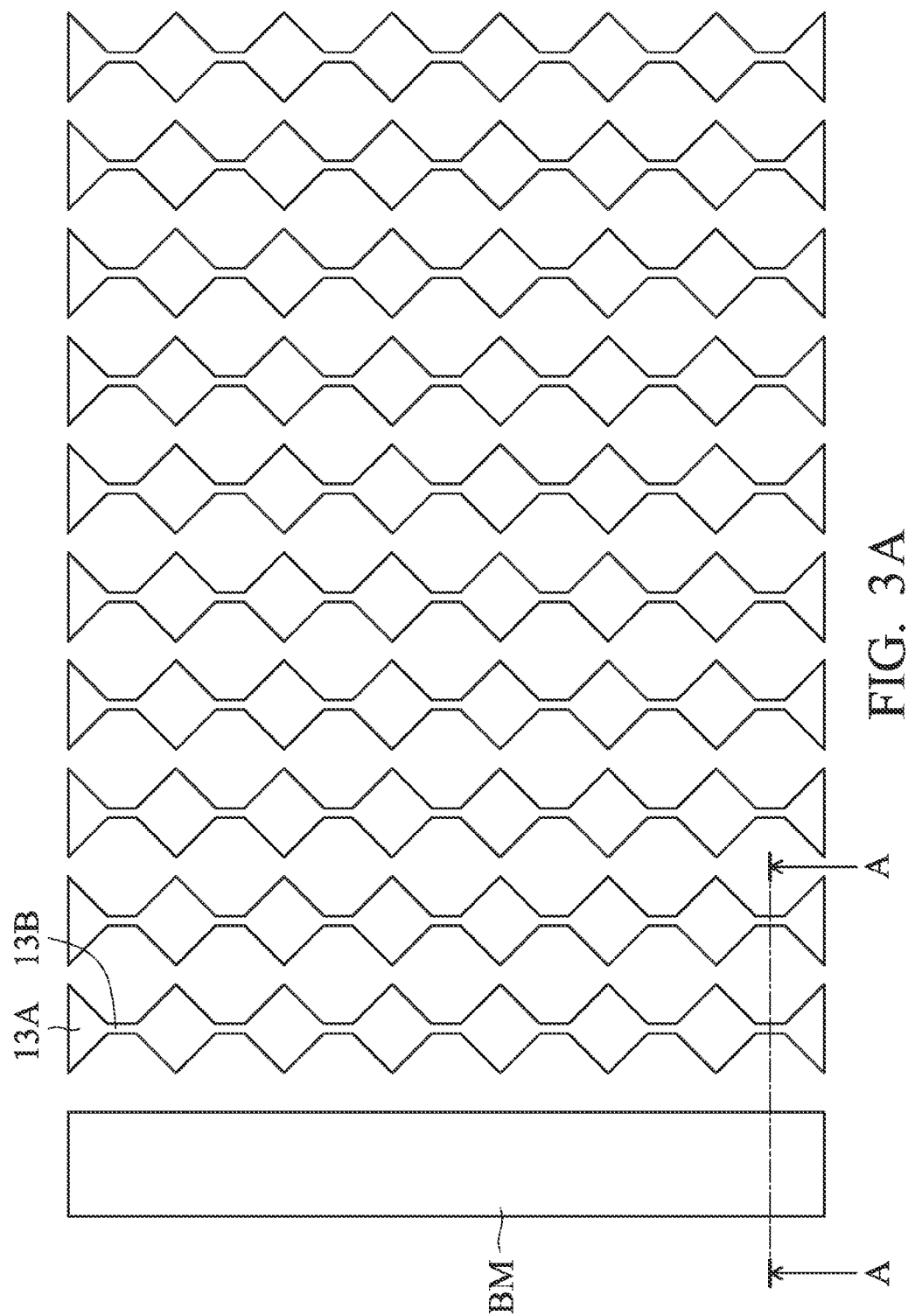

TOUCH DEVICE

CROSS REFERENCE TO RELATED APPLICATIONS

This Application claims priority of Taiwan Patent Application No. 104100492, filed on Jan. 8, 2015, the entirety of which is incorporated by reference herein.

BACKGROUND

Technical Field

The disclosure relates to a touch device, and in particular it relates to a contact via in a touch device.

Description of the Related Art

Conventional touch devices usually include sensing electrodes and traces electrically connected thereto on a substrate. The traces can be electrically connected to a bonding pad set, and the bonding pad set can be further electrically connected to an external circuit (i. e. flexible circuit board). As such, the current or signals can be transferred from the external circuit to the sensing electrodes through the bonding pad set and the traces, thereby driving the touch device.

In the conventional art, the described elements are usually electrically connected through contact holes. However, residual etchant used in the formation of the contact vias in an etching process usually remains in the corners of the bottom of the contact vias. This residual etchant may cause over-etching problems. In addition, if the corners of the top of the contact vias have an overly small angle (e.g. less than or equal to 90 degrees), it will cause point-discharge problems. Accordingly, a novel contact via is called for to solve the problems described above.

BRIEF SUMMARY

One embodiment of the disclosure provides a touch device, comprising a substrate, a first sensing electrode disposed on the substrate, an insulation layer, and a trace. The insulation layer is disposed on the first sensing electrode. The insulation layer includes a first contact via exposing a part of a terminal of the first sensing electrode. The trace is disposed on the insulation layer and is electrically connected to the terminal of the first sensing electrode through the first contact via. A corner of the first contact via includes a first edge, a second edge, and a third edge. The second edge is disposed between the first edge and the third edge. A line that extends from the first edge and the second edge, and a line that extends from the third edge, define a region that has a first area, which is greater than 0.

One embodiment of the disclosure provides a touch device, comprising: a substrate; a first sensing electrode disposed on the substrate; an insulation layer disposed on the first sensing electrode, wherein the insulation layer includes a first contact via exposing a part of a terminal of the first sensing electrode; and a trace disposed on the insulation layer and electrically connected to the terminal of the first sensing electrode through the first contact via. A corner of the first contact via includes a first edge, a second edge, and a third edge, and the second edge is disposed between the first edge and the third edge. The first edge and the second edge have an angle therebetween of greater than 90 degrees, and the second edge and the third edge have an angle therebetween of greater than 90 degrees.

A detailed description is given in the following embodiments with reference to the accompanying drawings.

BRIEF DESCRIPTION

The disclosure can be more fully understood by reading the subsequent detailed description and examples with references made to the accompanying drawings, wherein:

FIGS. 3A to 3E show top views of a touch device during manufacture in one embodiment of the disclosure;

DETAILED DESCRIPTION

The following description is of the best-contemplated mode of carrying out the disclosure. This description is made for the purpose of illustrating the general principles of the disclosure and should not be taken in a limiting sense. The scope of the disclosure is determined by reference to the appended claims.

Figure 1A:
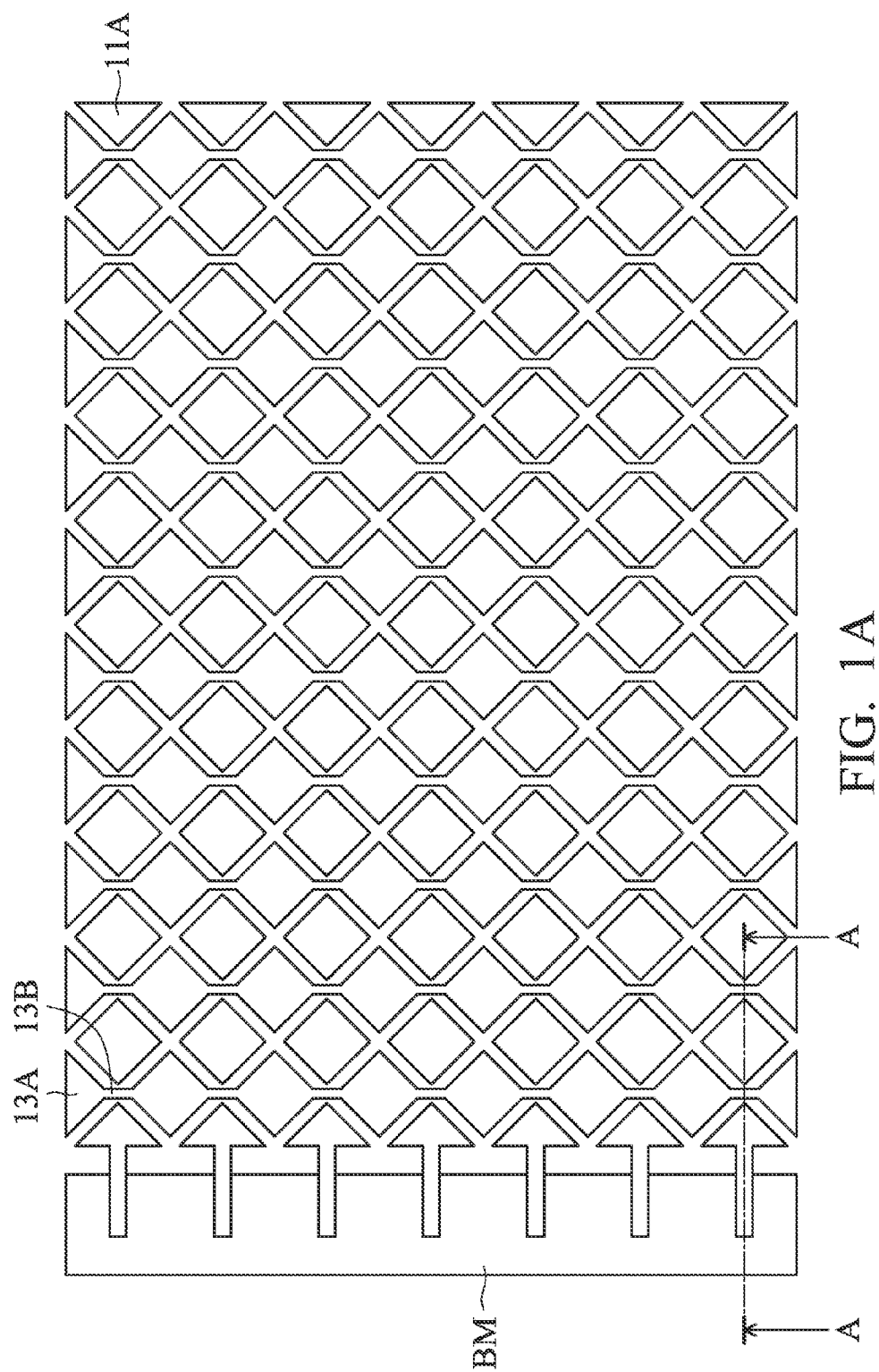
FIGS. 1A to 1D show top views of a touch device during manufacture in one embodiment of the disclosure.

FIGS. 1A to 1D show top views of a touch device during manufacture in one embodiment of the disclosure. FIGS. 2A to 2D show cross sections of the touch device along a line A-A in FIGS. 1A to 1D, respectively. As shown in FIGS. 1A and 2A, a black matrix BM is formed on a substrate 10, and sensing electrodes 11A and 13A and connection electrodes 13B are then formed on the substrate 10. Sensing electrodes 13A in the same columns are connected by connection electrodes 13B. Sensing electrodes 11A are separated without being connected to each other, and are not in contact with sensing electrodes 13A and connection electrodes 13B. Although sensing electrodes 11A and 13A are rhombuses with the same area in the following embodiments and drawings, it should be understood that the sensing electrodes can be other shapes (triangle, tetragon, hexagon, or the like) with the same or different areas if necessary. In one embodiment, the substrate 10 can be glass or plastic. In one embodiment, the material of the black matrix BM can be black resin, and the black matrix BM can be formed by sputtering or printing. In one embodiment, the material of sensing electrodes 11A and 13A and connection electrodes 13B can be a transparent conductive material such as indium tin oxide (ITO), and sensing electrodes 11A and 13A and connection electrodes 13B can be formed by sputtering or screen printing.

Figure 1B:
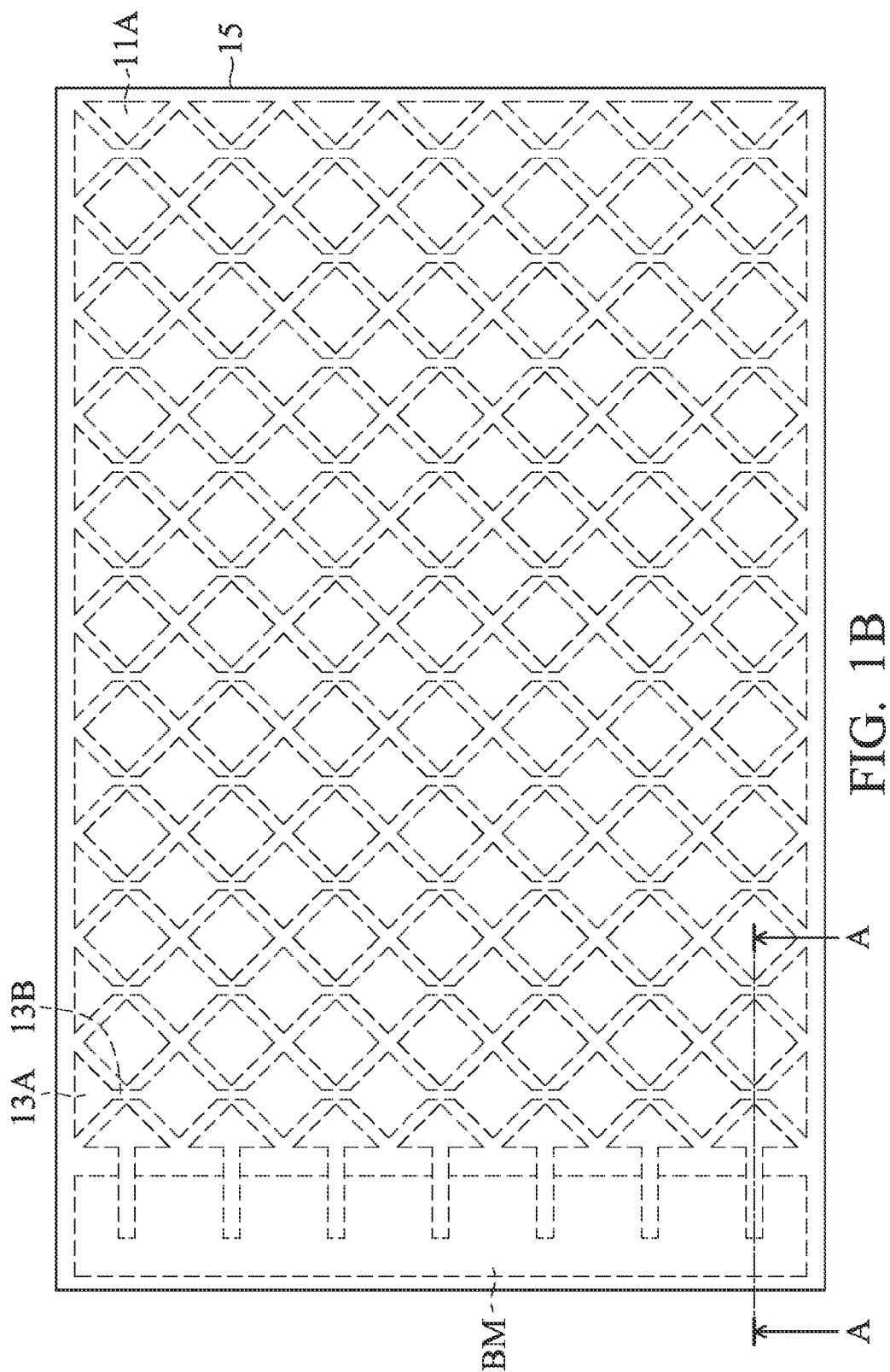
Figure 2A:
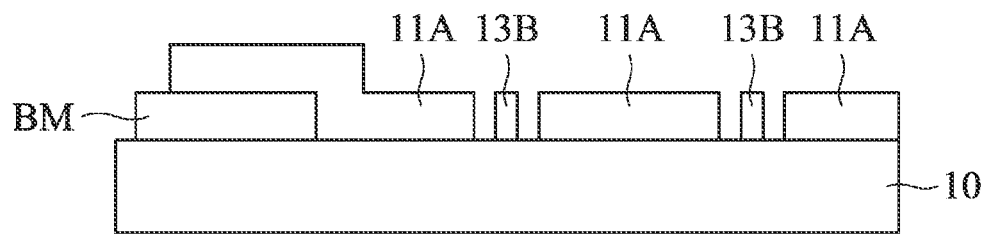
FIGS. 2A to 2D show cross sections of the touch device along a line A-A in FIGS. 1A to 1D, respectively.
Figure 2B:
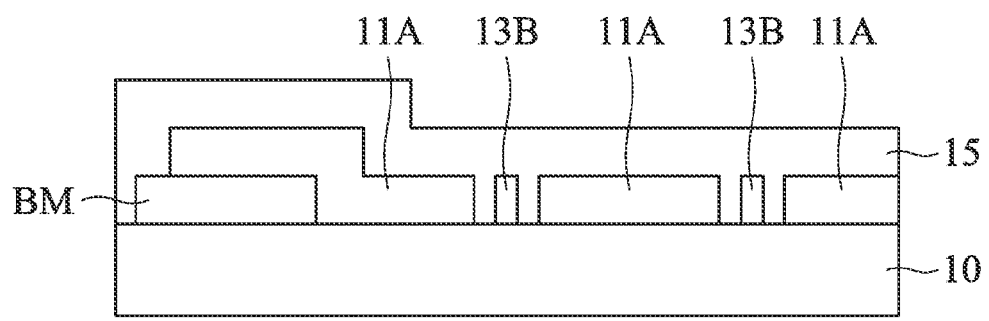

As shown in FIGS. 1B and 2B, an insulation layer 15 is then formed on the substrate 10, the black matrix BM, sensing electrodes 11A and 13A, and connection electrodes 13B. The material of the insulation layer 15 can be an inorganic material (i.e. silicon oxide or silicon nitride) or an organic material (i.e. photoresist). The insulation layer 15 can be formed by chemical vapor deposition (CVD), physical vapor deposition (PVD), or sputtering.

Figure 1C:
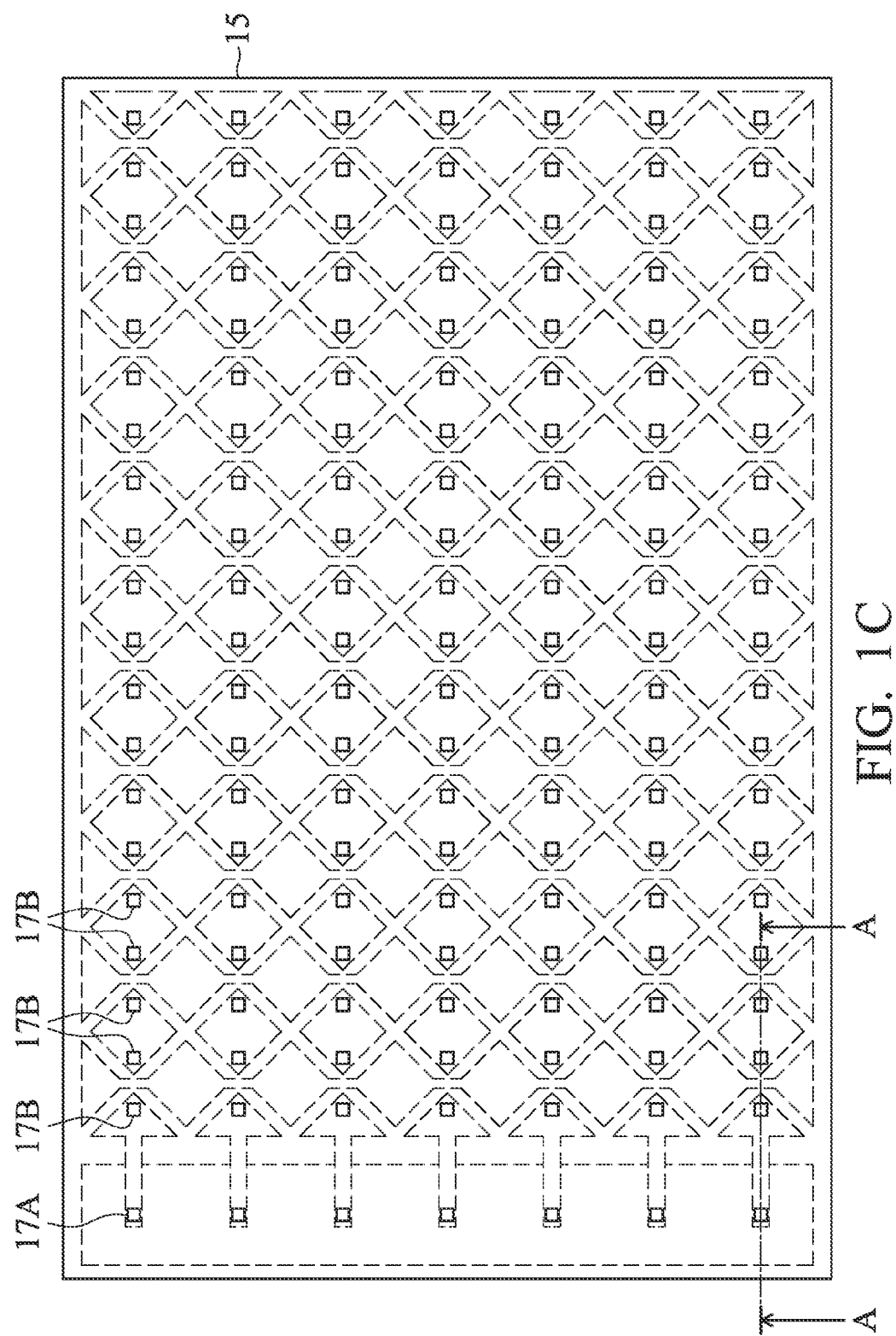
Figure 2C:
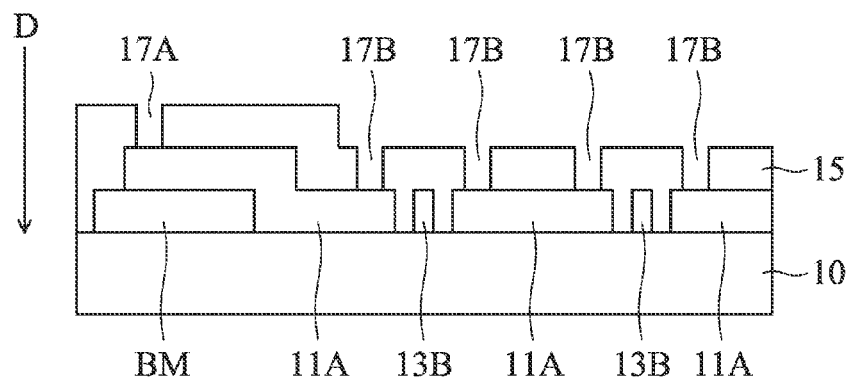

As shown in FIGS. 1C and 2C, first contact vias 17A are formed to penetrate the insulation layer 15 on terminals of sensing electrodes 11A over the black matrix BM, and second contact vias 17B are formed to penetrate the insulation layer 15 on two sides of sensing electrodes 11A. The first contact vias 17A and the second contact vias 17B can be formed by lithography and etching processes. In general, side views of the first contact vias 17A and the second contact vias 17B can be inverted trapezoids (narrow bottom and wide top), rectangles (bottom and top are equal in width), or trapezoids (wide bottom and narrow top). Top views of the first contact vias 17A and the second contact vias 17B will be described in detail below.

Figure 1D:
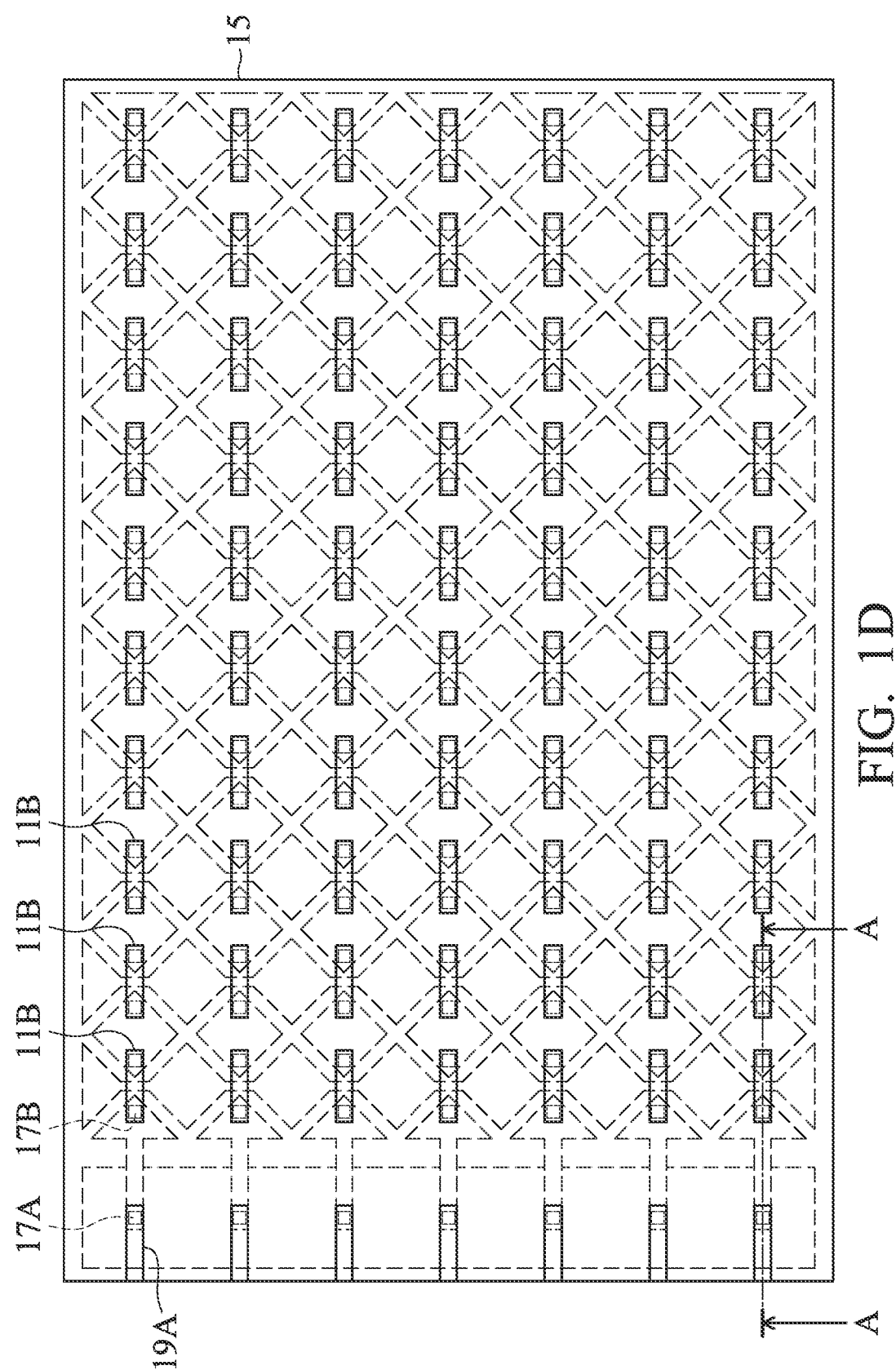
Figure 2D:
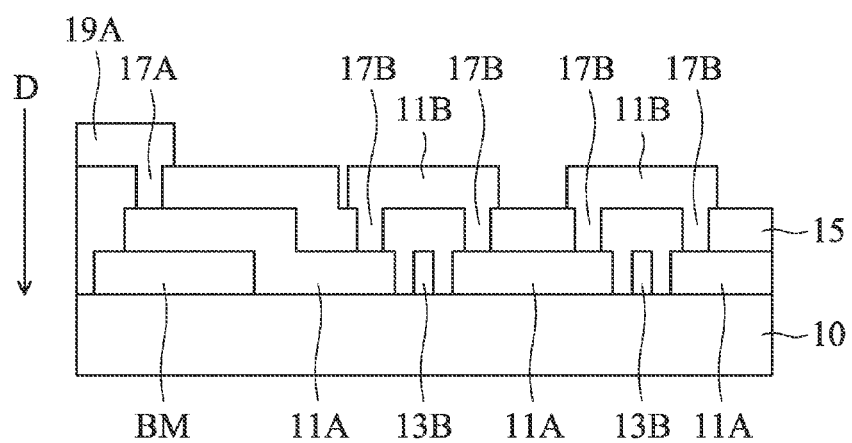

As shown in FIGS. 1D and 2D, traces 19A and connection electrodes 11B are then formed. In one embodiment, the material of the traces 19A and connection electrodes 11B can be metal such as silver, copper, aluminum, an alloy thereof, or transparent conductive material such as indium tin oxide (ITO), indium zinc oxide (IZO), a combination thereof, or a multi-layered structure thereof. The traces 19A and connection electrodes 11B can be formed by sputtering or screen printing. As shown in FIG. 2D, the trace 19A on the insulation layer 15 is electrically connected to the terminal of the sensing electrode 11A through the first contact via 17A. Connection electrode 11B on the insulation layer 15 is electrically connected to the two adjacent sensing electrodes 11A through the second contact vias 17B, such that sensing electrodes 11A in the same column can be electrically connected. It should be noted that, in other embodiments, the connection electrodes 11B can be formed on the substrate 10, the insulation layer 15 is then formed on the substrate 10, the black matrix BM, and the connection electrodes 11B, and the second contact vias 17B are formed to penetrate the insulation layer 15 on two sides of connection electrodes 11B. Sensing electrodes 11A on the insulation layer 15 is electrically connected to the connection electrodes 11B through the second contact vias 17B, such that sensing electrodes 11A in the same column can be electrically connected.

The traces 19A can be also connected to bonding pads (not shown) to electrically connect to an external circuit. It should be understood that sensing electrodes 13A can be electrically connected to the bonding pads and the external circuit with the described design of the contact vias and the traces. The touch device can be integrated into a display device to complete a touch display apparatus.

Figure 3B:
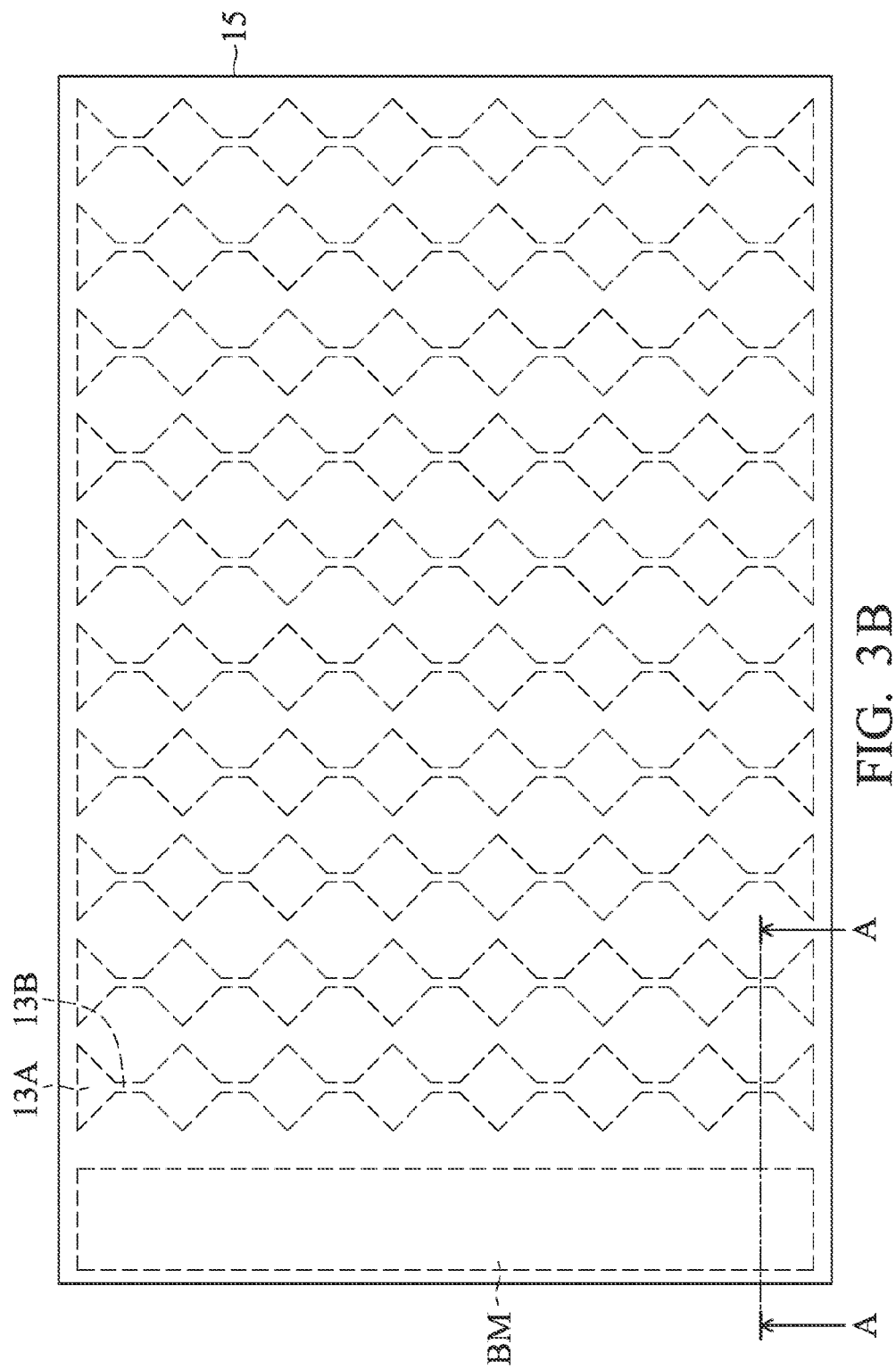

FIGS. 3A to 3E show top views of a touch device during manufacture in one embodiment of the disclosure. FIGS. 4A to 4E show cross sections of the touch device along a line A-A in FIGS. 3A to 3E, respectively. As shown in FIGS. 3A and 4A, a black matrix BM is formed on a substrate 10, and sensing electrodes 13A and connection electrodes 13B are then formed. Sensing electrodes 13A in the same column are electrically connected by connection electrodes 13B. The materials and methods for forming the substrate 10, the black matrix BM, sensing electrodes 13A, and connection electrodes 13B are similar to that in the embodiment described above, and the related description is therefore omitted here.

Figure 4A:
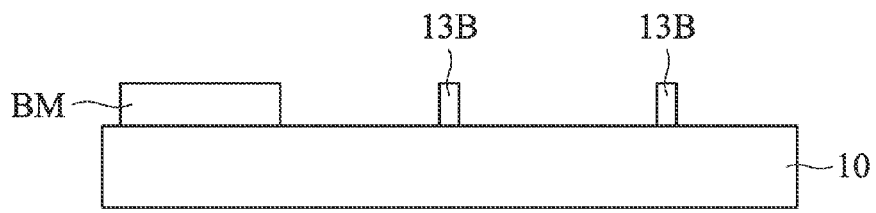
FIGS. 4A to 4E show cross sections of the touch device along a line A-A in FIGS. 3A to 3D, respectively.
Figure 4B:
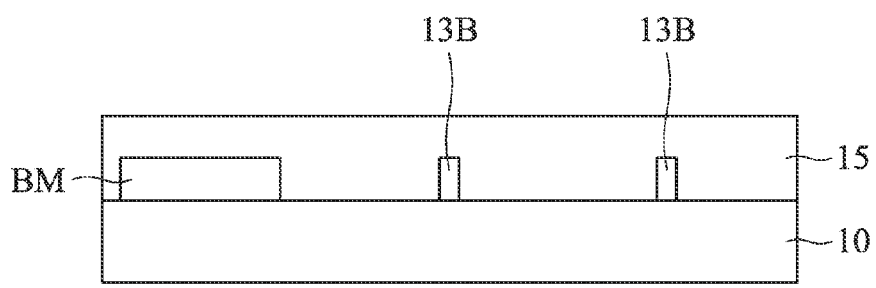

As shown in FIGS. 3B and 4B, an insulation layer 15 is then formed on the substrate 10, the black matrix BM, sensing electrodes 13A, and connection electrodes 13B. The material and method for forming the insulation layer 15 are similar to that in the embodiment described above, and the related description is therefore omitted here.

Figure 3C:
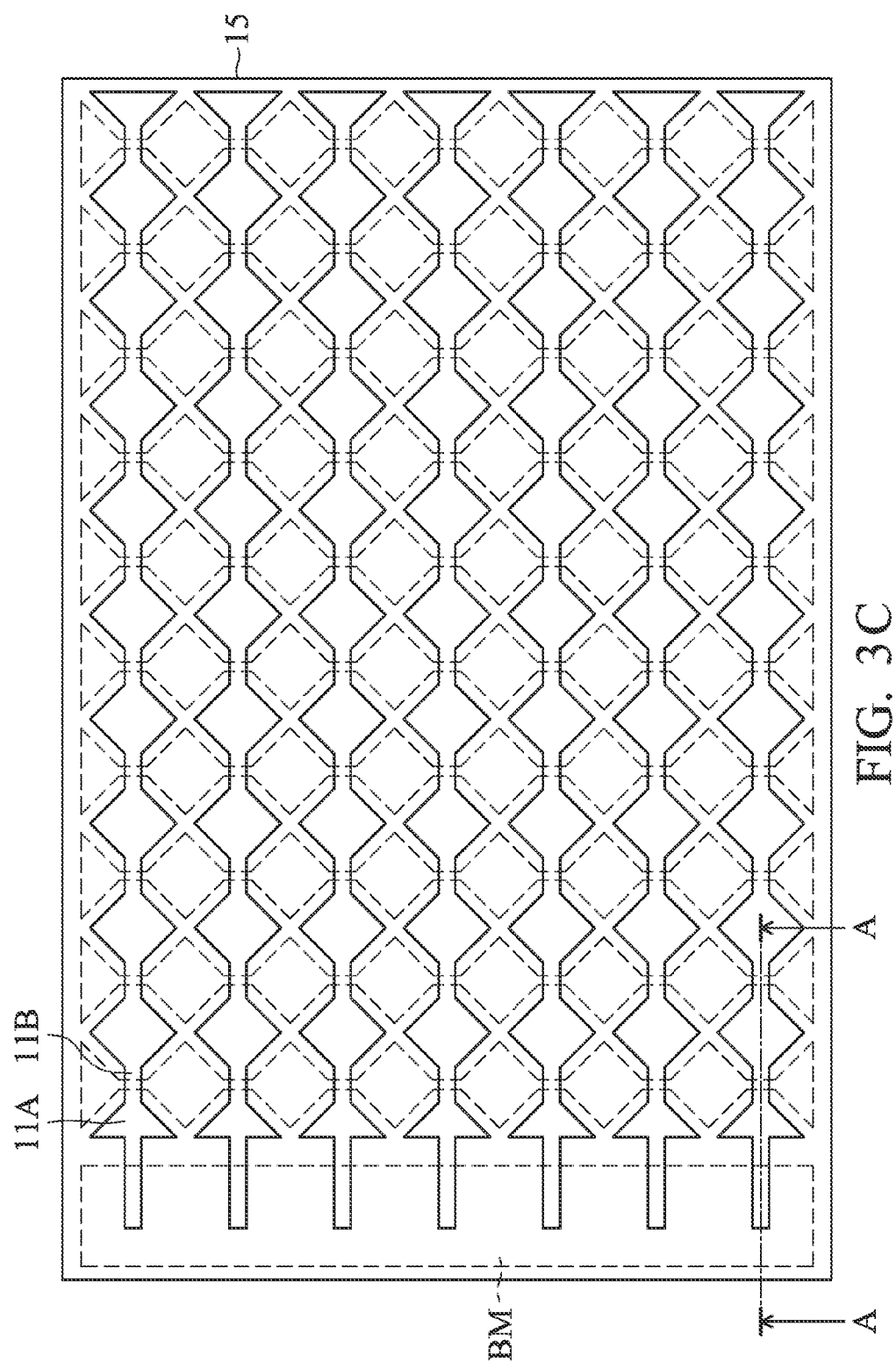
Figure 4C:
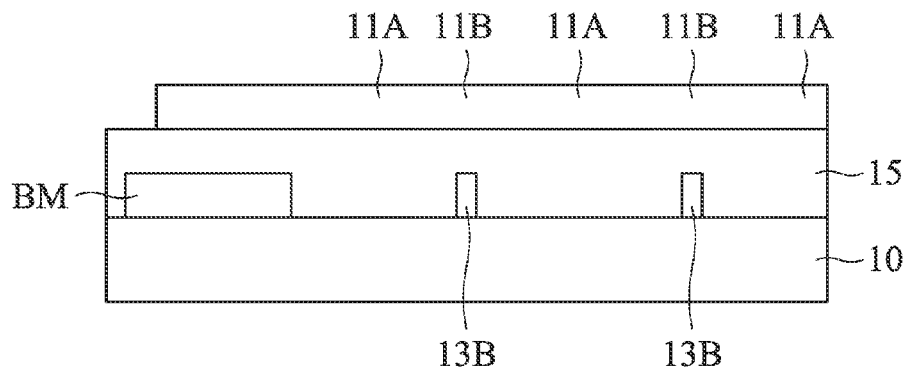

As shown in FIGS. 3C and 4C, sensing electrodes 11A and connection electrodes 11B are then formed on the insulation layer 15. Sensing electrodes 11A in the same column are connected by connection electrodes 11B, and terminals of sensing electrodes 11A are disposed on the black matrix BM. The material and the method for forming sensing electrodes 11A and connection electrodes 11B is similar to that for sensing electrodes 13A and connection electrodes 13B, and the related description is therefore omitted here.

Figure 3D:
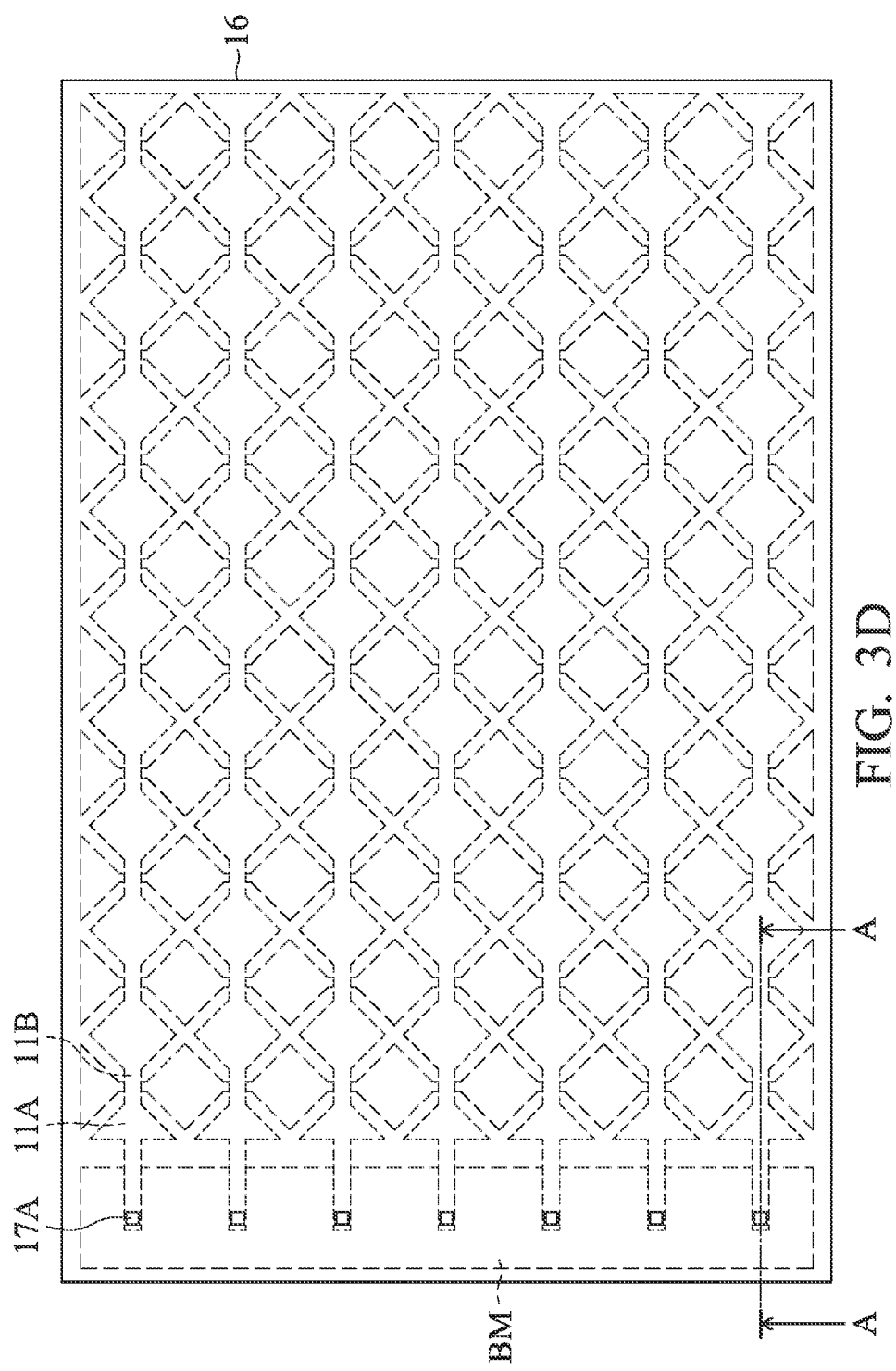
Figure 4D:
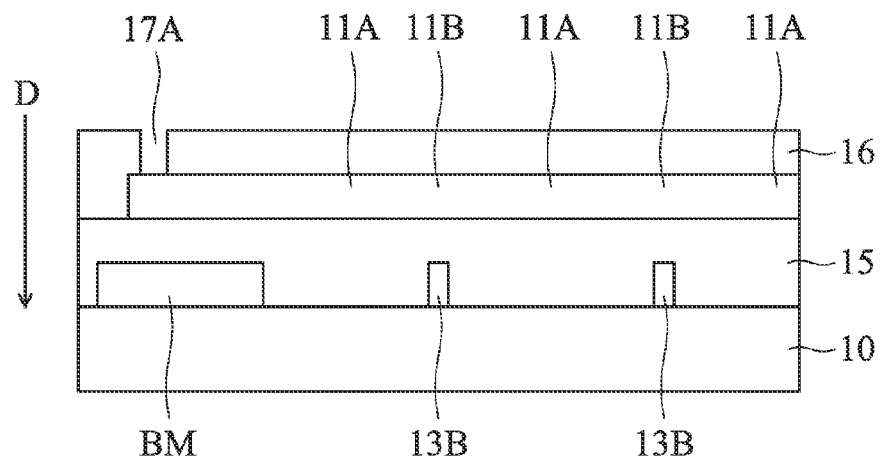

As shown in FIGS. 3D and 4D, an insulation layer 16 is then formed on the insulation layer 15, sensing electrodes 11A, and connection electrodes 11B. The material and method for forming the insulation layer 16 is similar to that of the insulation layer 15, and the related description is therefore omitted here. Furthermore, first contact vias 17A are defined to expose terminals of sensing electrodes 11A on the black matrix BM. The method for forming the first contact vias is similar to that in the embodiment described above, and the related description is therefore omitted here.

Figure 3E:
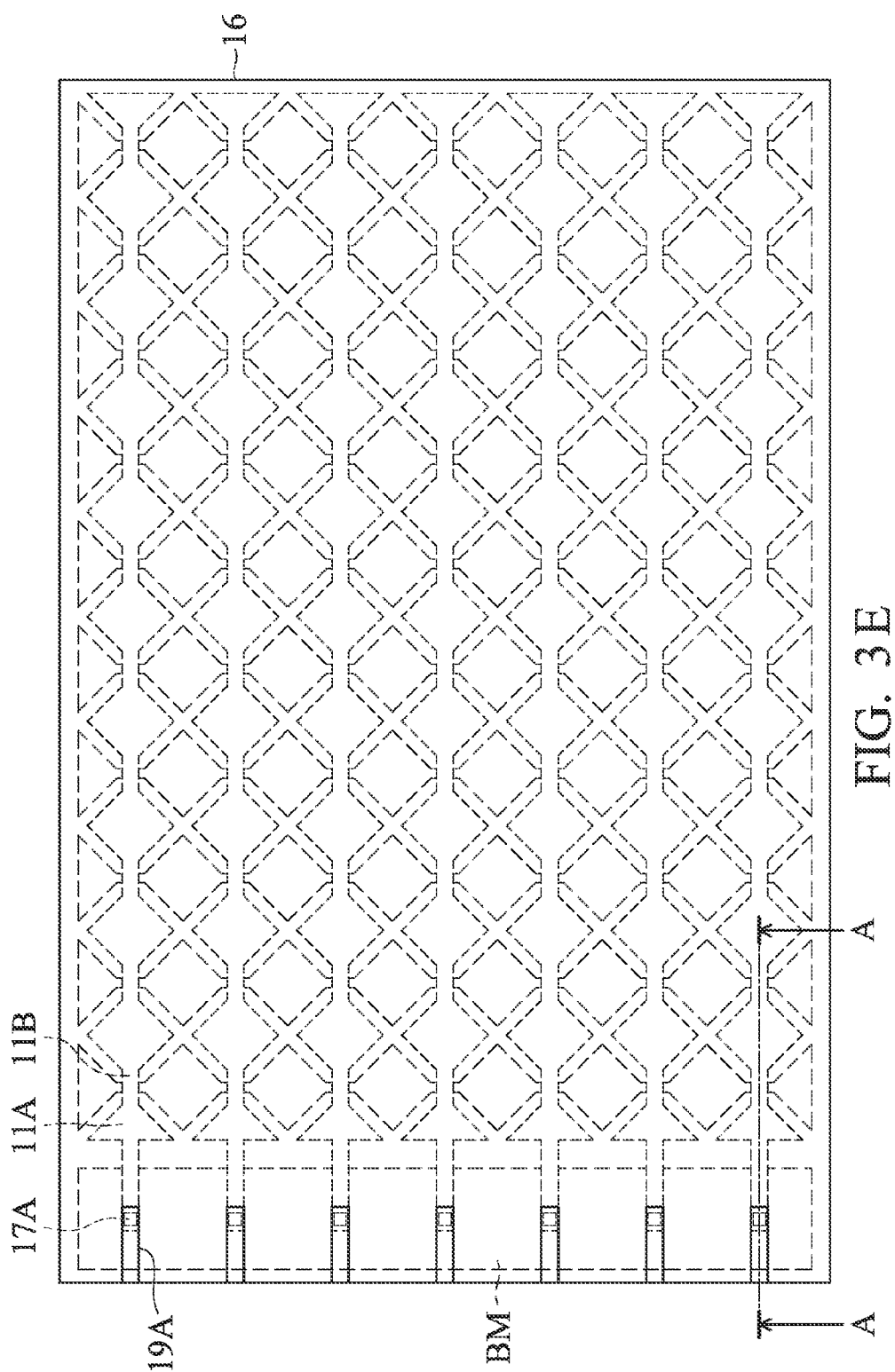
Figure 4E:
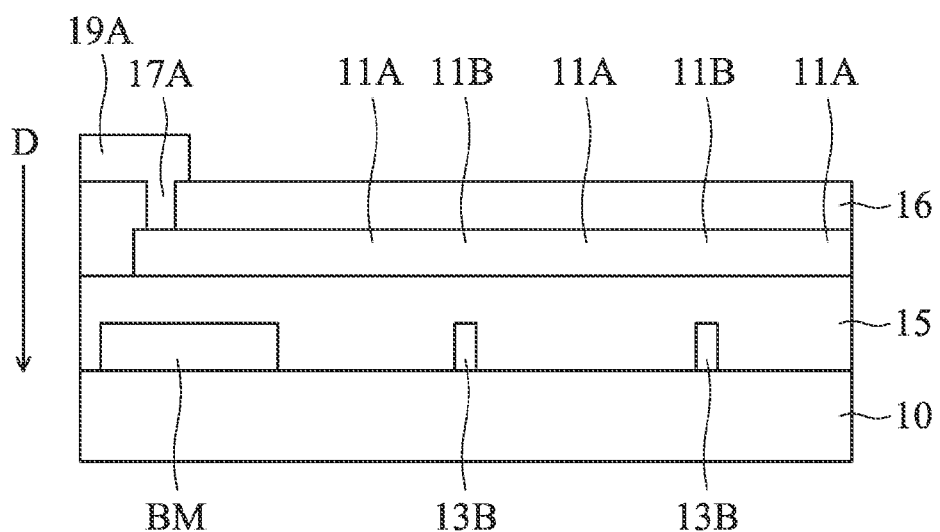

As shown in FIGS. 3E and 4E, traces 19A are then formed. The material and the method for forming the traces 19A are similar to those in the embodiment described above, and the related description is therefore omitted here. As shown in FIG. 3E, the traces 19A on the insulation layer 15 are electrically connected to the terminal of sensing electrodes 11A through the first contact via 17A. Similarly, the traces 19A can be also connected to bonding pads (not shown) to electrically connect to an external circuit. It should be understood that sensing electrodes 13A can be electrically connected to the bonding pads and the external circuit with the described design of the first contact vias and the traces. The touch device can be integrated into a display device to complete a touch display apparatus.

Figure 5A:
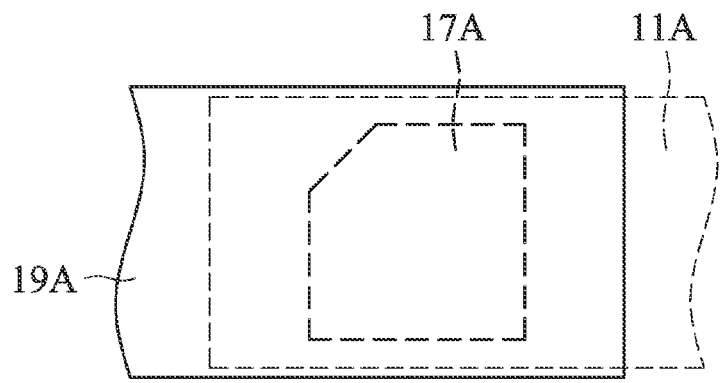
FIGS. 5A to 5C show top views of a first contact via in embodiments of the disclosure.

FIG. 5A shows a top view of the first contact via 17A in one embodiment of the disclosure. In one embodiment, FIG. 5A is a cross section of a bottom of the first contact via 17A, and the cross section of the first contact via 17A is parallel to a surface of the substrate (and vertical to the direction D which is vertical to a surface of the substrate). Alternatively, FIG. 5 is a cross section of a top of the first contact via 17A, and the cross section of the first contact via 17A is parallel to a surface of the substrate (and vertical to the direction D which is vertical to a surface of the substrate). In other embodiments, FIG. 5 is a cross section of any cross section between the top and the bottom of the first contact via 17A, and the cross section of the first contact via 17A is parallel to a surface of the substrate (and vertical to the direction D which is vertical to a surface of the substrate).

Figure 5B:
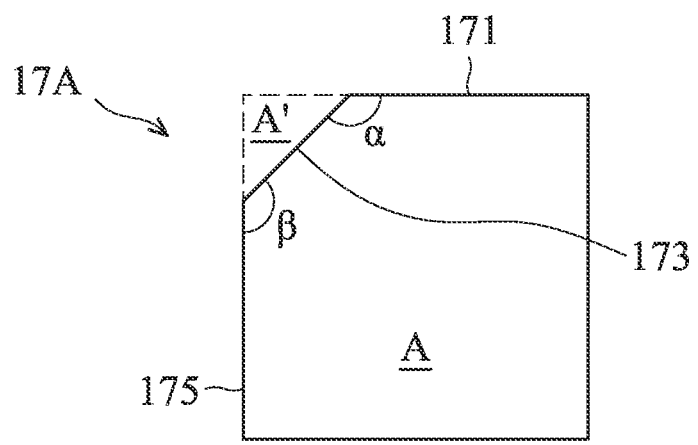

FIG. 5B is used to further illustrate the first contact via 17A in FIG. 5A. As shown in FIG. 5B, a corner of the first contact via 17A is defined by a first edge 171, a second edge 173, and a third edge 175. The second edge 173 is disposed between the first edge 171 and the third edge 175. The cross section of the first contact via 17A has an area A, and the cross section of the first contact via 17A is parallel to a surface of the substrate (and vertical to the direction D which is vertical to a surface of the substrate). The region defined by an extended line of the first edge 171, the second edge 173, and an extended line of the third edge 175 has a first area A' of greater than 0. In one embodiment, the first area A' and the area A of the cross section have a ratio (A'/A) of 0.4% to 0.8%. An overly large first area A' may cause an overly high contact resistance. An overly small first area A' easily results in residual etchant.

As shown in FIG. 5B, the first edge 171 and the second edge 173 have a first angle $\alpha$ therebetween of greater than 90 degrees, and the second edge 173 and the third edge 175 have a second angle $\beta$ of greater than 90 degrees. In one embodiment, the first angle $\alpha$ and the second angle $\beta$ have a sum of 270 degrees. The first angle $\alpha$ and the second angle $\beta$ are less than 180 degrees and greater than 90 degrees, respectively. If FIG. 5B is a cross section of the bottom of the first contact via 17A, the first angle $\alpha$ and the second angle $\beta$ may prevent the etchant remained between the first edge 171 and the second edge 173 (or between the second edge 173 and the third edge 175). If FIG. 5B is a cross section of the top of the first contact via 17A, the first angle α and the second angle β may prevent point discharge.

Figure 5C:
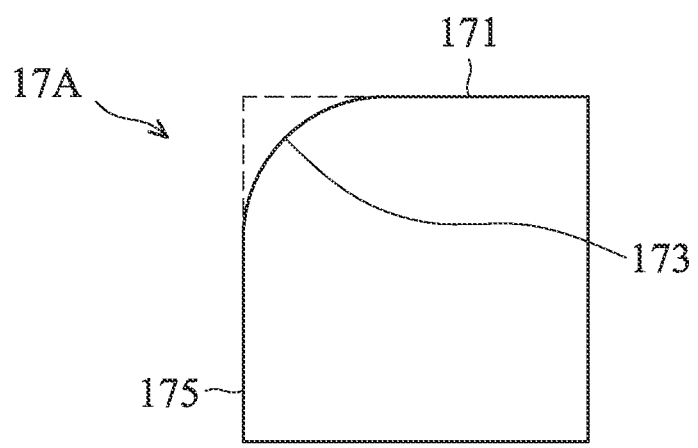

In one embodiment, the second edge 173 is linear, as shown in FIG. 5B. In another embodiment, the second edge 173 is curved, as shown in FIG. 5C. Whether the second edge 173 is linear or curved, it may prevent the residual etchant or point discharge problems.

Figure 6:
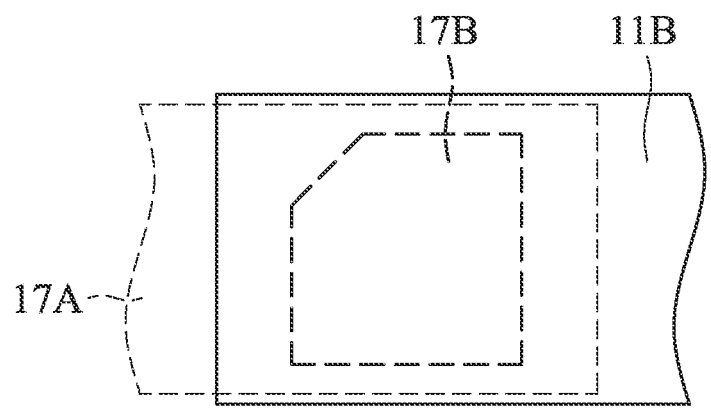
FIG. 6 shows a top view of a second contact via in one embodiment of the disclosure.

FIG. 6 shows a cross section of the second contact vias 17B, and the cross section is vertical to the direction D of the second contact vias 17B penetrating the substrate. Similarly, the cross section in FIG. 6 can be a top, a bottom, or any cross section between the top and the bottom of the second contact vias 17B. The fourth angle and the fifth angle of the corner of the second contact vias 17B, the second area (greater than 0) of a region defined by an extended line of the fourth edge, the fifth edge, and an extended line of the sixth edge, the area ratio of the second area and the cross section area, the curved edge, and the like are similar to that of the first contact vias 17A in FIGS. 5A to 5C, and the related description is therefore omitted here.

Although the first contact vias 17A and the second contact vias 17B only have one cut corner, it should be understood that the contact vias may have more cut corners. For example, all four corners of the contact vias may have a first edge 171, a second edge, and a third edge 175.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device, comprising:
   a substrate;
   a first sensing electrode disposed on the substrate;
   an insulation layer disposed on the first sensing electrode, wherein the insulation layer includes a first contact via exposing a part of a terminal of the first sensing electrode; and
   a trace disposed on the insulation layer and electrically connected to the terminal of the first sensing electrode through the first contact via,
   wherein a corner of the first contact via includes a first edge, a second edge, and a third edge in a top-view, and the second edge is disposed between the first edge and the third edge,
   wherein an extended line of the first edge, the second edge, and an extended line of the third edge define a region with a first area greater than 0.

2. The touch device as claimed in claim 1, wherein in the top-view, a cross section of the first contact via is parallel to a surface of the substrate, and the corner of the first contact via is a corner of the cross section of the first contact via.

3. The touch device as claimed in claim 2, wherein the first area and an area of the cross section of the first contact via have a ratio of 0.4% to 0.8%.

4. The touch device as claimed in claim 1, wherein the second edge is linear.

5. The touch device as claimed in claim 1, wherein the second edge is curved.

6. The touch device as claimed in claim 1, wherein the insulation layer further comprises a second contact via, and the touch device further comprises a connection electrode electrically connected to the first sensing electrode through the second contact via.

7. The touch device as claimed in claim 6, wherein a corner of the second contact via includes a fourth edge, a fifth edge, and a sixth edge in the top view, and the fifth edge is disposed between the fourth edge and the sixth edge, and
   wherein an extended line of the fourth edge, the fifth edge, and an extended line of the sixth edge defines a region with a second area greater than 0.

8. The touch device as claimed in claim 6, wherein in the top-view, a cross section of the second contact via is parallel to a surface of the substrate, and the corner of the second contact via is a corner of the cross section of the second contact via.

9. The touch device as claimed in claim 8, wherein the second area and an area of the cross section of the second contact via have a ratio of 0.4% to 0.8%.

10. The touch device as claimed in claim 7, wherein the fifth edge is linear.

11. The touch device as claimed in claim 7, wherein the fifth edge is curved.

12. The touch device as claimed in claim 1, wherein the terminal of the first sensing electrode is disposed on a black matrix.

13. A touch device, comprising:
    a substrate;
    a first sensing electrode disposed on the substrate;
    an insulation layer disposed on the first sensing electrode, wherein the insulation layer includes a first contact via exposing a part of a terminal of the first sensing electrode; and
    a trace disposed on the insulation layer and electrically connected to the terminal of the first sensing electrode through the first contact via,
    wherein a corner of the first contact via includes a first edge, a second edge, and a third edge in a top-view, and the second edge is disposed between the first edge and the third edge,
    wherein the first edge and the second edge have an angle therebetween of greater than 90 degrees, and the second edge and the third edge have an angle therebetween of greater than 90 degrees.

14. The touch device as claimed in claim 13, wherein in the top-view, a cross section of the first contact via is parallel to a surface of the substrate, and the corner of the first contact via is a corner of the cross section of the first contact via.

15. The touch device as claimed in claim 13, wherein the second edge is linear.

16. The touch device as claimed in claim 13, wherein the second edge is curved.

17. The touch device as claimed in claim 13, wherein the insulation layer further comprises a second contact via, and the touch device further comprises a connection electrode electrically connected to the first sensing electrode through the second contact via.

18. The touch device as claimed in claim 17, wherein a corner of the second contact via includes a fourth edge, a fifth edge, and a sixth edge in the top-view, and the fifth edge is disposed between the fourth edge and the sixth edge, and
    wherein the fourth edge and the fifth edge have an angle therebetween of greater than 90 degrees, and the fifth edge and the sixth edge have an angle therebetween of greater than 90 degrees.

19. The touch device as claimed in claim 18, wherein in the top-view, a cross section of the second contact via is parallel to a surface of the substrate, and the corner of the second contact via is a corner of the cross section of the second contact via.

20. The touch device as claimed in claim 18, wherein the fifth edge is curved.

\* \* \* \* \*